J. C. Bell,
Plow Fender.
No. 94,383.  Patented Aug. 31, 1869.
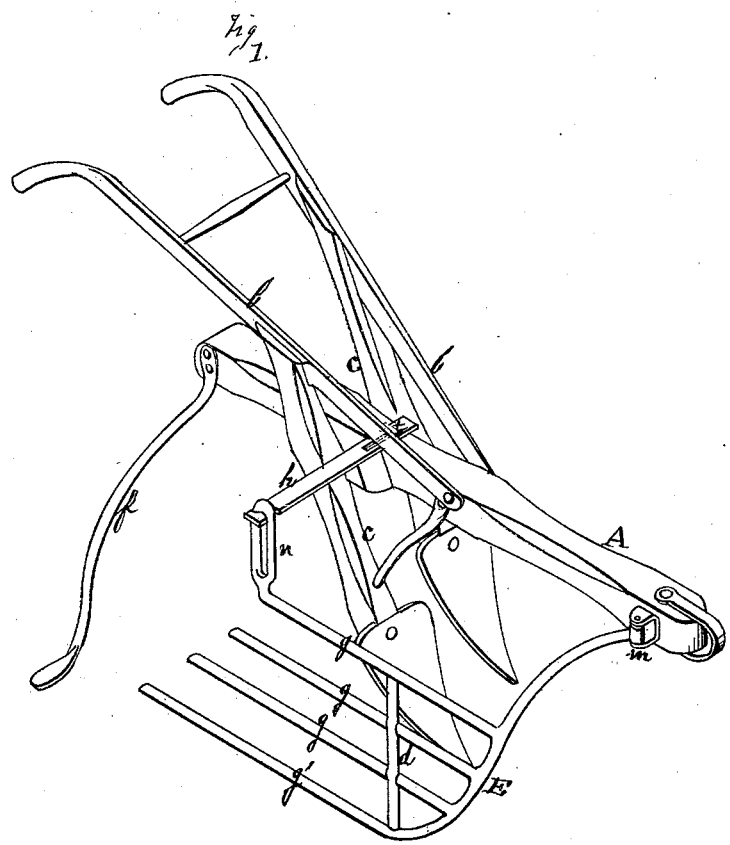
Witnesses
J. A. Ellis
H. N. Miller
Inventor
J. C. Bell

UNITED STATES PATENT OFFICE.

JAMES C. BELL, OF LEBANON, INDIANA.

IMPROVEMENT IN PLOWS.

Specification forming part of Letters Patent No. 94,383, dated August 31, 1869.

*To all whom it may concern:*

Be it known that I, J. C. BELL, of Lebanon, in the county of Boone and State of Indiana, have invented certain new and useful Improvements in Plows; and I do hereby declare that the following is a full, clear, and exact description thereof, reference being had to the accompanying drawing, and to the letters of reference marked thereon, which forms a part of this specification, in which—

Figure 1 is a perspective view of my plow.

The nature of my invention consists in the construction of a clod-fender and in the mode of attaching it to a plow.

A represents the beam of my plow; $b\ b$, the handles; and $c\ c$, the standards, to which the shovels are attached. The two standards $c\ c$ are bolted to opposite sides of beam A, the standard on the right-hand side of the beam being in advance of the one on the left.

E designates a clod-fender formed of horizontal ribs $g$, the front end of said ribs being made solid with the lower rib, $g'$, which inclines out and upward at an angle of about forty-five degrees, and is bent in a horizontal position near its end, so as to enter the clip $m$. The hinder end of the upper rib, $g$, is furnished with a vertical attachment, $n$, which has a slot in it to receive the bar $h$, the said bar having a notch in both edges, near its outer end, for the purpose of receiving the sides of attachment $n$ when the bar $h$ is inserted in the slot in $n$. Near the inner end of bar $h$ is a second slot, extending lengthwise of bar $h$. Through the said slot a bolt, $t$, is inserted, and serves to bind the bar $h$ to the plow-beam A.

In order to prevent my clod-fender from clogging, I secure the lateral bar $d$ to ribs $g$, near their front end. The action of said bar will break and divide the earth as it is thrown up from the furrow, and thus prevent it from adhering to the ribs $g$.

It will be observed that the bolt which confines bar $h$ to beam A is made with an oblong head, so that when placed in one direction the head will pass through the slot in $h$; but when the head is placed at right angles with the slot it will bind the bar $h$ firmly to the plow-beam.

If it is desired to remove the clod-fender from the plow, all that is necessary will be to raise the inner end of bar $h$ from the head of bolt $t$, as above described, turn the bar $h$ edge upward and release it from the slot in $n$, and then disengage the rib $g'$ from the clip $m$, and the object is effected.

To the hinder end of beam A, I attach the rod $f$, which is bent outward at its lower end and flattened. This rod may serve as a fulcrum to facilitate the raising the shovels out of the earth when necessary.

Having thus described my invention, what I claim and desire to secure by Letters Patent, is—

The combination and arrangement of clod-fender E, bar $h$, clip $m$, beam A, and fulcrum-rod $f$, substantially as and for the purpose specified.

In testimony that I claim the foregoing as my own I affix my signature in presence of two witnesses.

JAMES C. BELL.

Witnesses:
CHRISTIAN S. WESNER,
ABRAM O. MILLER.